(12) United States Patent
Kanakamedala et al.

(10) Patent No.: US 9,199,407 B2
(45) Date of Patent: Dec. 1, 2015

(54) IN-MOLD GRAIN APPLICATION

(71) Applicant: NYX, Inc., Livonia, MI (US)

(72) Inventors: Vijay Kanakamedala, Canton, MI (US); Joseph E. Packett, Canton, MI (US)

(73) Assignee: NYX, Ltd., Livonia, MI (US)

( * ) Notice: Subject to any disclaimer, the term of this patent is extended or adjusted under 35 U.S.C. 154(b) by 0 days.

(21) Appl. No.: 14/223,250

(22) Filed: Mar. 24, 2014

(65) Prior Publication Data

US 2014/0287085 A1 Sep. 25, 2014

Related U.S. Application Data

(60) Provisional application No. 61/804,269, filed on Mar. 22, 2013.

(51) Int. Cl.
*B29C 51/16* (2006.01)
*B29C 51/00* (2006.01)
*B29C 51/02* (2006.01)
*B29C 51/14* (2006.01)
*B29C 51/26* (2006.01)
*B29C 51/10* (2006.01)
*B29C 51/46* (2006.01)
*B29C 63/48* (2006.01)
*B29K 105/00* (2006.01)
*B29L 9/00* (2006.01)
*B29K 21/00* (2006.01)
*B29K 75/00* (2006.01)
*B29C 51/04* (2006.01)
*B29C 51/18* (2006.01)
*B29C 51/32* (2006.01)
*B29C 63/22* (2006.01)

(52) U.S. Cl.
CPC ............. *B29C 51/167* (2013.01); *B29C 51/002* (2013.01); *B29C 51/02* (2013.01); *B29C 51/14* (2013.01); *B29C 51/261* (2013.01); *B29C 51/04* (2013.01); *B29C 51/10* (2013.01); *B29C 51/18* (2013.01); *B29C 51/32* (2013.01); *B29C 51/46* (2013.01); *B29C 63/22* (2013.01); *B29C 2063/485* (2013.01); *B29K 2021/003* (2013.01); *B29K 2075/00* (2013.01); *B29K 2105/0097* (2013.01); *B29L 2009/005* (2013.01)

(58) Field of Classification Search
CPC .... B05C 1/083; B05C 1/0882; B05C 1/0891; B29C 51/167; B29C 63/22; B29C 2063/485
USPC ........... 118/249, 259; 156/578; 425/506, 112; 264/135
See application file for complete search history.

(56) References Cited

U.S. PATENT DOCUMENTS 3,518,334 A * 6/1970 MacLam et al. ............... 264/544
3,989,937 A * 11/1976 Fay et al. ....................... 700/123
(Continued)

FOREIGN PATENT DOCUMENTS

JP 07289982 A * 11/1995

*Primary Examiner* — Robert B Davis
(74) *Attorney, Agent, or Firm* — Carlson, Gaskey & Olds, P.C.

(57) ABSTRACT

An in-mold grain application system includes a forming machine and an adhesive applicator. The adhesive applicator is configured to apply adhesive to a cover stock sheet prior to the sheet entering the forming machine. A controller is connected to the adhesive applicator and configured to command the adhesive applicator and control the adhesive application to the sheet.

20 Claims, 2 Drawing Sheets

(56) References Cited

U.S. PATENT DOCUMENTS

| | | | |
|---|---|---|---|
| 4,369,157 A * | 1/1983 | Conner | 264/246 |
| 5,707,697 A * | 1/1998 | Spain et al. | 428/31 |
| 7,670,447 B2 * | 3/2010 | Minamida et al. | 156/60 |
| 2007/0054116 A1 * | 3/2007 | Neitzke | 428/343 |
| 2010/0255273 A1 * | 10/2010 | Chang et al. | 428/203 |
| 2010/0260971 A1 * | 10/2010 | Chang | 428/141 |

* cited by examiner

IN-MOLD GRAIN APPLICATION

CROSS REFERENCE TO RELATED APPLICATION

This application claims priority to U.S. Provisional Application No. 61/804,269 filed on Mar. 22, 2013.

BACKGROUND

The present disclosure is related generally to in-mold grain application.

In-mold grain application provides the ability to imprint high definition grain on, for example, automotive door panel bolsters and substrates. This allows the end product to retain the required softness desired by the customer. Grooves, simulated stitching, and small radii can be formed on the surface of the part.

Traditional in-mold grain processes involve spray application of adhesive on the plastic substrate via a manual spray gun or a robot mounted spray gun, often resulting in inconsistency and potential delamination between the grain stock and substrate.

SUMMARY

An in-mold grain application system includes a forming machine and an adhesive applicator configured to apply adhesive to a cover stock sheet prior to the sheet entering the forming machine. A controller is connected to the adhesive applicator and configured to command the adhesive applicator and control application of the adhesive to the sheet.

The controller may command the adhesive applicator with computer numeric control. In some examples, the controller controls the thickness of the applied adhesive or controls the dispensing rate of the adhesive applicator.

These and other features disclosed herein can be best understood from the following specification and drawings, the following of which is a brief description.

DETAILED DESCRIPTION

Figure 1:
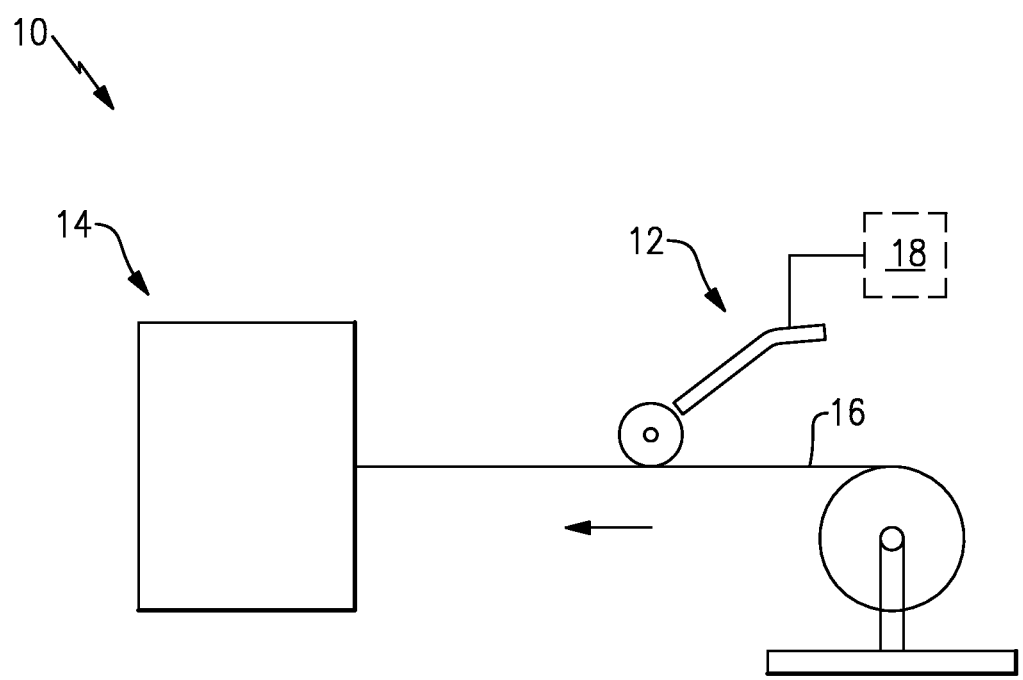
FIG. 1 shows an example in-mold grain application system.

Referring to FIG. 1, the example in-mold grain application system 10 includes an adhesive applicator 12 and a forming machine 14. In this example, system 10 is configured to run a cover stock sheet 16 through the adhesive applicator 12 and then in line to the forming machine 14 to create a continuous in-mold grain application process. For example, the cover stock sheet 16 can be thermoplastic vulcanized rubber and the adhesive can be polyurethane-based (PUR) and polyolefin-based (POR), although it is to be understood that the cover stock sheet and adhesives are not limited to these examples.

The adhesive applicator 12 applies adhesive to the cover stock sheet 16, for the purpose of bonding the cover stock sheet 16 to a substrate. A controller 18 is connected to and configured to command the adhesive applicator 12, which, as one example, is conducted by way of computer numerical control (CNC). The controller 18 and adhesive applicator 12 can control the thickness of the applied adhesive to be within a predetermined thickness of a target thickness, the dispensing rate of the adhesive applicator 12, as well as the speed of the cover stock sheet 16.

After adhesive application, the cover stock 16 is continuously and directly fed into the forming machine 14. That is, adhesive is applied to the cover stock 16 in line before the cover stock 16 enters the forming machine 14. The forming machine 14 then molds the cover stock 16 into a desired shape and bonds the cover stock sheet 16 to a substrate.

Figure 2:
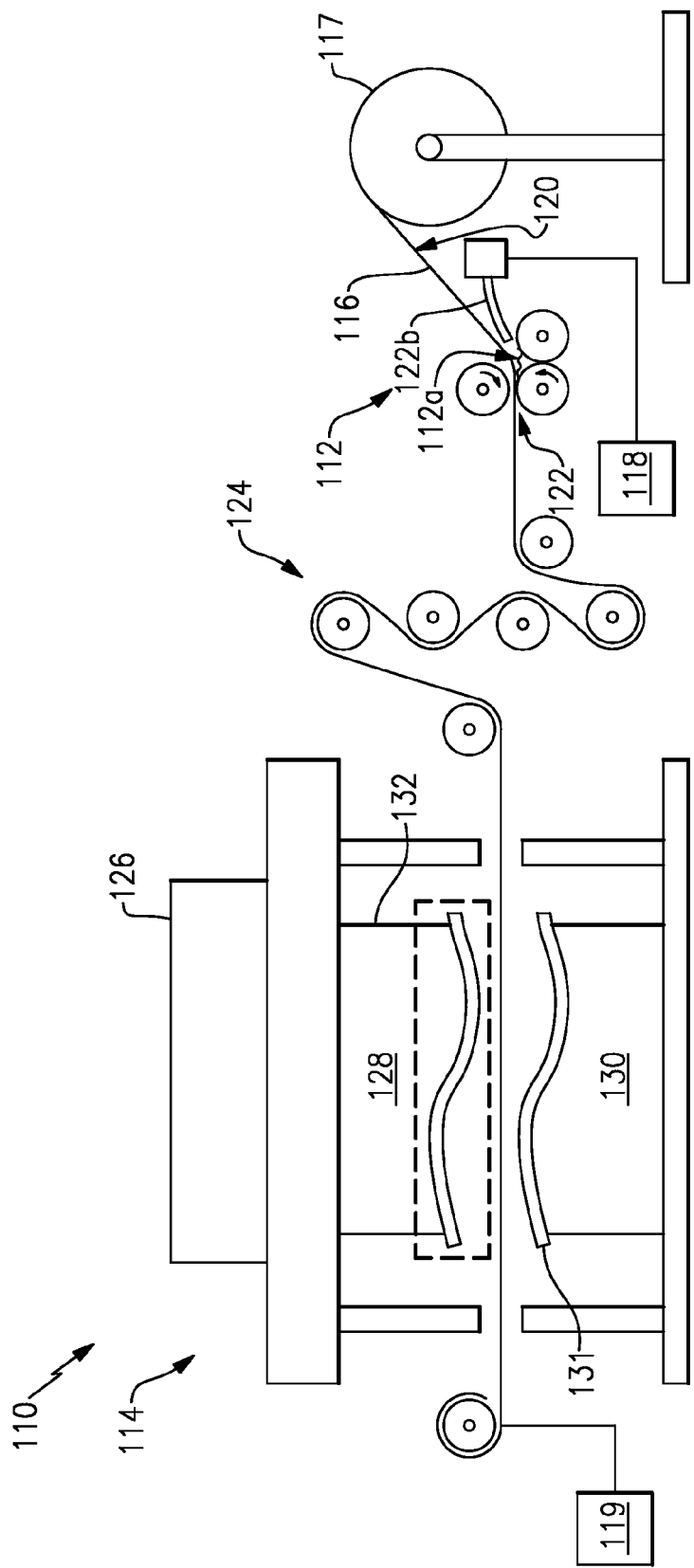
FIG. 2 shows another example in-mold grain application system.

FIG. 2 shows another example in-mold grain application system 110 configured to receive cover stock 116. The system 110 includes an adhesive applicator 112 and a vacuum forming machine 114. The system 110 is configured to run the cover stock sheet 116 through the adhesive applicator 112 and then in line to the forming machine 114 to create a continuous in-mold grain application process. In the example, the cover stock sheet 116 originates from a roll 117, and is continuously conveyed via a conveyance system 119 through the adhesive applicator 112 to the forming machine 114.

The adhesive applicator 112 includes an adhesive feed line 120 and one or more adjustable adhesive applicator rolls 122. The example applicator rolls 122 include one roll above the cover stock sheet 116 and two rolls below the cover stock sheet 116, and are adjustable by the controller 118 in a direction perpendicular to the surface of the cover stock sheet 116 to control adhesive thickness, for example. In this example, the two lower rolls are situated side-by-side to provide a well 112a in which to hold adhesive for application to the underside of the cover stock sheet 116. A dispenser 112b can selectively dispense adhesive into the well 112a to maintain a predetermined amount adhesive in the well 112a.

In FIG. 3, the bottom left applicator roll 122 carries adhesive from the well 112a and applies and spreads the adhesive into the underside of the cover stock sheet 116. The rotational speed of this roll, speed of the cover stock sheet 116 and distance between this roll and the top roll can be controlled, individually or in cooperation, to thereby control a thickness of adhesive applied to the cover stock sheet 116.

In this regard, a controller 118 may command the adhesive applicator 112 to achieve a desired thickness of adhesive. As one example, the controller 118 controls the dispensing rate of the adhesive, the amount of the adhesive dispensed between the lower rolls, the speed of the left bottom roll, and/or the speed of the cover stock sheet 116 to obtain and maintain a target adhesive thickness. The controller 118 may perform one or multiple of these functions. That is, the controller 118 can be used to set the adhesive application parameters for an adhesive application process, or alternatively can dynamically adjust one or more of the above parameters to maintain the applied adhesive thickness in a target range.

After the adhesive is applied, the cover stock 116 passes through one or more accumulator rolls 124 that support and pre-tension the cover stock 116 prior to feeding into the vacuum forming machine 114. The accumulator rolls 124 serve as a buffer for any extra cover stock sheet 116 in case the vacuum forming machine 114 faults and is not accepting any more feed stock.

The vacuum forming machine 114 includes a vacuum generator 126, a tool cavity 128 and a plug assist 130 for forming the cover stock 116 into its desired shape and bonding the cover stock 116 to a substrate 131. The cover stock 116 passes through the vacuum forming machine 114 between the tool cavity 128 and the tool plug assist 130, and over the substrate 131. The vacuum forming machine may further include in tool cover stock trimming with profile knife blades 132 to trim the cover stock 116 with respect to the part geometry. The vacuum forming machine 114 is capable of reversing vacuum direction from core to cavity within a few seconds to release the molded part. The system 110 may also utilize in line automated tool changing.

The system 110 thus provides the ability to precisely and consistently control adhesive application, providing better resistance to delamination. The continuous and automated process provides significant efficiency.

Although an embodiment of this invention has been disclosed, a worker of ordinary skill in this art would recognize that certain modifications would come within the scope of this invention. For that reason, the following claims should be studied to determine the true scope and content of this invention.

We claim:

1. An in-mold grain application system comprising:
   a forming machine;
   an adhesive applicator configured to apply adhesive to a sheet prior to and in line with said sheet entering said forming machine; and
   a controller connected to said adhesive applicator and configured to command said adhesive applicator and control application of said adhesive to said sheet.

2. The in-mold grain application system of claim 1, wherein said controller is configured to control a thickness of said applied adhesive.

3. The in-mold grain application system of claim 1, wherein said controller is configured to command said adhesive applicator by computer numerical control programming.

4. The in-mold grain application system of claim 1, wherein said controller is configured to control a dispensing rate of said adhesive applicator and speed of said sheet.

5. The in-mold grain application system of claim 1, wherein said adhesive applicator includes an adhesive feed line and at least one adhesive applicator roll; and said feed line is situated to disperse adhesive onto said at least one applicator roll or said sheet prior to said at least one applicator roll.

6. An in-mold grain application system comprising:
   an adhesive applicator configured to apply adhesive to a sheet, wherein said adhesive applicator includes an adhesive feed line and at least one adhesive applicator roll; and
   a vacuum forming machine configured to mold said sheet in a tool cavity, wherein said adhesive applicator is in line with said vacuum forming machine.

7. The in-mold grain application system of claim 6 further comprising a plurality of accumulator rolls guiding and pre-tensioning said sheet between said adhesive applicator and said vacuum forming machine.

8. The in-mold grain application system of claim 6, wherein said vacuum forming machine includes profile knife blades configured to trim said sheet within said forming machine.

9. The in-mold grain application system of claim 6, further comprising a conveyance system configured to move said sheet through said adhesive applicator continuously to said forming machine.

10. The in-mold grain application system of claim 6, further comprising a controller connected to said adhesive applicator and configured to command said adhesive applicator and control application of said adhesive.

11. The in-mold grain application system of claim 10, wherein said controller is configured to control a speed of said sheet moving through said adhesive applicator to control an amount of adhesive applied.

12. The in-mold grain application system of claim 10, wherein said controller is configured to control a thickness of said applied adhesive.

13. The in-mold grain application system of claim 6, wherein said at least one adhesive applicator roll is adjustable.

14. A method of grain application comprising:
    applying adhesive to a sheet with an adhesive applicator;
    controlling the applying of said adhesive with respect to at least one of adhesive thickness and dispensing rate, using a controller;
    molding said sheet;
    conveying said sheet continuously from said adhesive applicator to a forming machine that performs said molding step.

15. The method of claim 14, wherein, before said conveying step, providing a substrate in said forming machine, and wherein said molding said sheet comprises bonding said sheet to said substrate.

16. The in-mold grain application system of claim 6, wherein said adhesive applicator comprises
    two adhesive applicator rolls below said sheet to create a well to hold adhesive for application to an underside of said sheet; and
    a dispenser to selectively dispense adhesive into said well to maintain a predetermined amount of adhesive in said well.

17. The in-mold grain application system of claim 16, comprising a controller configured to control a rotational speed of one of said two adhesive applicator rolls, a dispensing rate of said dispenser, and said amount of adhesive in said well with respect to a target adhesive thickness.

18. The in-mold grain application system of claim 1, wherein said adhesive applicator comprises
    two adhesive applicator rolls below said sheet to create a well to hold adhesive for application to an underside of said sheet; and
    a dispenser to selectively dispense adhesive into said well with regard to a predetermined amount of adhesive in said well.

19. The in-mold grain application system of claim 18, wherein said controller is configured to control a rotational speed of one of said two adhesive applicator rolls, a dispensing rate of said dispenser, and said amount of adhesive in said well with regard to a target adhesive thickness.

20. The in-mold grain application system of claim 1, wherein said controller is configured to adjust rotational speed of said adhesive applicator, dispensing rate of said adhesive, speed of said sheet, and distance between two rolls of said adhesive applicator with regard to a target adhesive thickness.

* * * * *